F. GALLAGHER.
TIRE FOR WHEELS.
APPLICATION FILED MAR. 31, 1910.
1,006,376.
Patented Oct. 17, 1911.
2 SHEETS—SHEET 1.
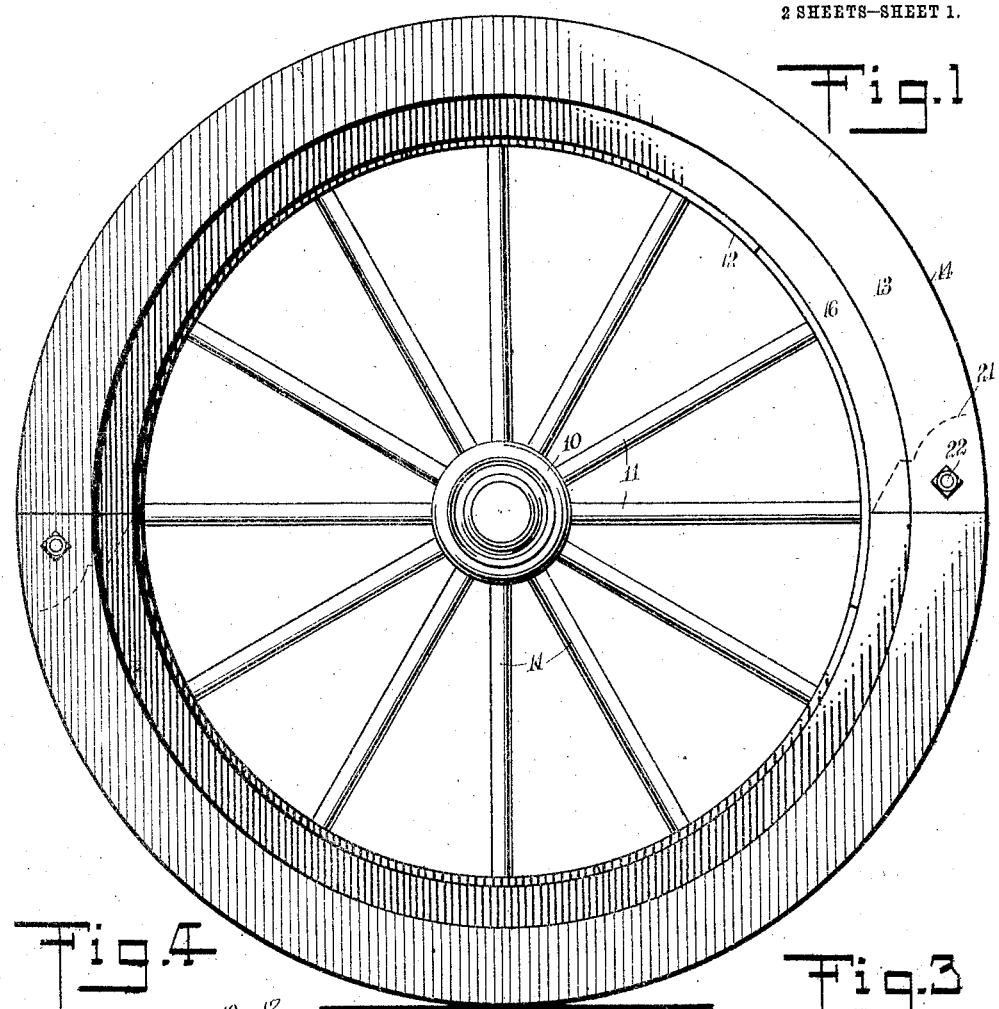
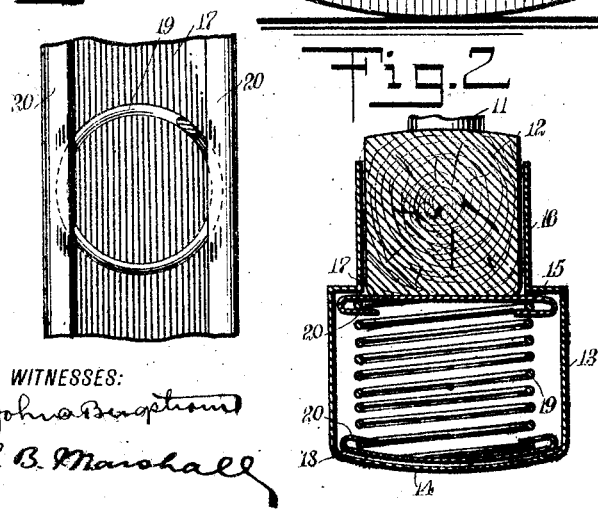
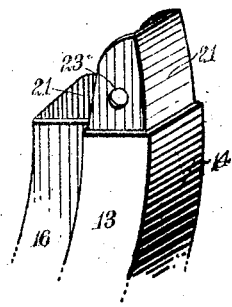
WITNESSES:
INVENTOR
Frank Gallagher
BY
ATTORNEYS F. GALLAGHER.
TIRE FOR WHEELS.
APPLICATION FILED MAR. 31, 1910.
1,006,376.
Patented Oct. 17, 1911.
2 SHEETS—SHEET 2.
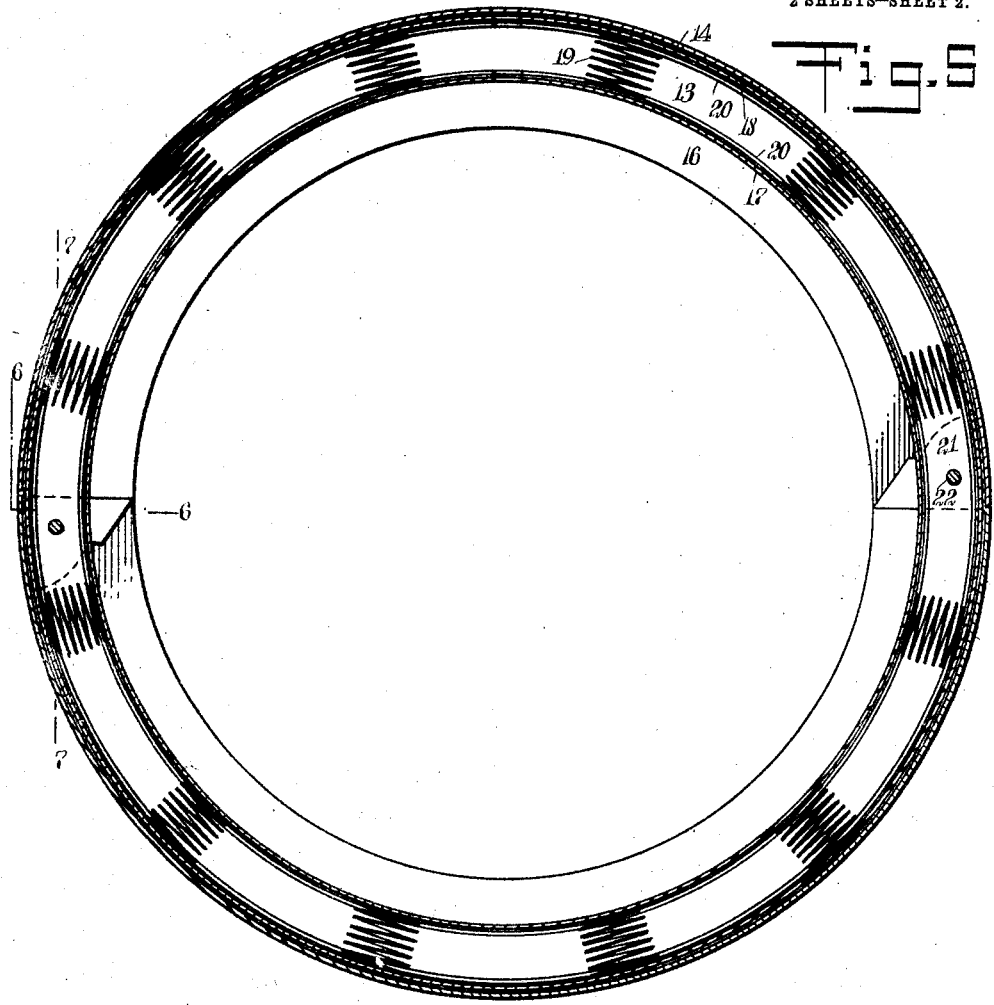
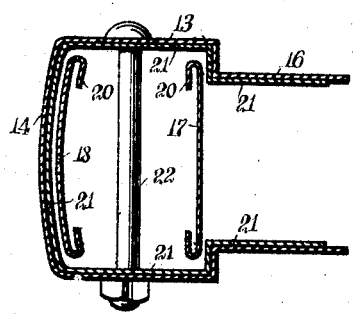
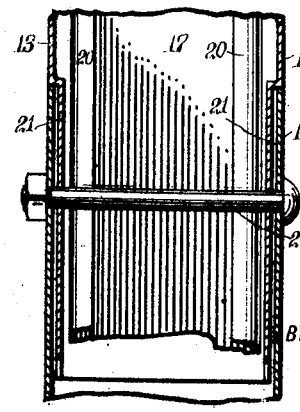
WITNESSES:
INVENTOR
Frank Gallagher
BY
ATTORNEYS

UNITED STATES PATENT OFFICE.

FRANK GALLAGHER, OF RIDGEWAY, IOWA.

TIRE FOR WHEELS.

1,006,376.  Specification of Letters Patent.  Patented Oct. 17, 1911.

Application filed March 31, 1910. Serial No. 552,555.

*To all whom it may concern:*

Be it known that I, FRANK GALLAGHER, a citizen of the United States, and a resident of Ridgeway, in the county of Winneshiek and State of Iowa, have invented a new and Improved Tire for Wheels, of which the following is a full, clear, and exact description.

My invention relates to tires for wheels, and it has for its object to provide a tire which may be readily adjusted to a wheel, the tire being provided with springs which hold the tread of the tire yieldingly extended from the felly of the wheel. The tire is made in sections which are bolted together around the felly of the wheel.

Still other objects of the invention will appear in the following complete description.

In this specification I will describe the preferred form of my invention, it being understood that the scope of the invention is defined in the appended claims.

Reference is to be had to the accompanying drawings forming a part of this specification, in which similar characters of reference indicate corresponding parts in all the views, and in which—

Figure 1 is a side elevation of a wheel with my tire mounted thereon; Fig. 2 is an enlarged transverse sectional view through the felly and the tire; Fig. 3 is a perspective view showing a terminal of one of the sections of the rim; Fig. 4 is a fragmentary view showing one of the annular members disposed in the rim to which the springs are secured; Fig. 5 is a longitudinal sectional view of the tire; Fig. 6 is a sectional view on the line 6—6 of Fig. 5, the spring being removed; and Fig. 7 is a sectional view on the line 7—7 of Fig. 5.

By referring to the drawings it will be seen that I show a vehicle wheel having the usual hub 10, spokes 11 and a felly 12. My tire, which is provided in two sections, is adapted to be mounted on the said vehicle wheel. The tire has a rim 13, the side walls of which are preferably parallel and which are connected by a tread 14. At a distance from the tread 14 the side walls of the rim are offset inwardly, forming shoulders 15. Flanges 16, which are preferably integral with the inner sides of the offsets 15, project inwardly toward the hub of the wheel. The flanges 16 are parallel, one being disposed at each side of the felly 12. In the rim are disposed two annular members 17 and 18, the annular member 17 being disposed against the shoulders 15, and the annular member 18 being disposed against the inner side of the tread 14. These annular members 17 and 18 are held yieldingly away from each other by springs 19, the said springs 19 being spaced apart in the rim and being held in position relatively to the annular members 17 and 18 by being secured thereto. I prefer to secure the springs 19 to the said annular members 17 and 18 by turning over the sides 20 of the said annular members, the sides 20 engaging the ends of the springs and holding them to the bodies of the said annular members.

One end of each of the two sections of the tire has an offset terminal 21, which is adapted to be disposed in an abutting terminal of the other section, the terminals of the sections telescoping in this manner and being held together by means of a bolt 22, which is disposed through orifices 23, in the sides of the terminals of the rim to hold the sections together. The annular members 17 and 18 are constructed in two sections, said sections corresponding in length to the sections of the rim, so that when the bolts 22 are removed the sections of the rim may be separated, carrying with them the sections of the annular members 17 and 18 respectively.

In using the invention, the sections of the rim are disconnected by removing the bolts 22, and the sections are disposed around the felly 12 of the vehicle wheel, the felly 12 being disposed between the flanges 16 and abutting against the outer side of the sections of the annular member 17. The sections of the rim are then bolted together in the manner which has been described. When the wheel is used, the springs 19 press the annular member 17 against the periphery of the felly, thereby securing a frictional engagement between the wheel and the tire.

It will be understood that the number of the springs 19 in each tire may be regulated with reference to the use to which the tire is to be put.

Having thus described my invention, I claim as new and desire to secure by Letters Patent:

1. In a tire for wheels a rim having a tread and inwardly extending flanges with shoulders, a member disposed between the sides of the rim, a spring for holding the member normally away from the tread and against the shoulders, there being a space between the inner ends of the flanges, and a felly free from the member, disposed for moving in the said space and against the member.

2. In a vehicle tire, a felly, a rim having a tread and inwardly-extending flanges with shoulders midway between their ends, free from the felly, an annular member disposed in the rim between the tread and the shoulders, and springs for holding the annular member yieldingly in the direction of the shoulders, the felly being disposed between the said flanges and against the said annular member and being adapted to rotate continuously in one direction relatively thereto.

3. In a tire for wheels, a felly, a rim having a tread and inwardly-extending flanges with shoulders midway between their ends, free from the felly, the felly being disposed between the said flanges and being adapted to move relatively thereto, two annular members disposed in the rim between its tread and the shoulders, and springs between the said annular members, the  id annular members having their sides turned over to clamp the ends of the springs.

4. In a vehicle tire a felly, a rim having a tread and inwardly extending flanges with shoulders midway between their ends free from the felly and adapted to rotate continuously in one direction relatively to the felly, the felly being disposed between the said flanges, and being adapted to move relatively thereto, two annular members disposed in the rim between its tread and its shoulders, and radially disposed coil springs, one set of terminals of the springs being secured to one of the annular members normally disposed against the shoulders and the other set of terminals of the coil springs being secured to the other annular member disposed against the inner side of the tread.

In testimony whereof I have signed my name to this specification in the presence of two subscribing witnesses.

FRANK GALLAGHER.

Witnesses:
W. F. BAKER,
H. C. MYNLEID.